United States Patent [19]

Koh et al.

[11] Patent Number: 4,951,157
[45] Date of Patent: Aug. 21, 1990

[54] SYMMETRICAL IMAGE BLOCK SCANNING METHOD FOR REDUCING BLOCK EFFECT

[75] Inventors: Jong S. Koh; Jae K. Kim, both of Seoul, Rep. of Korea

[73] Assignee: Korea Advanced Institute of Science and Technology, Seoul, Rep. of Korea

[21] Appl. No.: 224,362

[22] Filed: Jul. 26, 1988

[30] Foreign Application Priority Data

Dec. 29, 1987 [KR] Rep. of Korea ............... 15237/1987

[51] Int. Cl.$^5$ ......................................... H04M 1/415
[52] U.S. Cl. ................................... 358/433; 358/445; 358/474
[58] Field of Search ................. 358/433, 445, 474, 138

[56] References Cited

U.S. PATENT DOCUMENTS 4,772,956  9/1988  Roche et al. ........................ 358/433

Primary Examiner—Edward L. Coles, Sr.
Attorney, Agent, or Firm—Fleit, Jacobson, Cohn, Price, Holman & Stern

[57] ABSTRACT

A scanning method for reducing block boundary effects in vector quantisation image coding by changing the scanning order to symmetrical ordering is disclosed. The method is based on a very simple symmetrical ordering between adjacent block boundaries and is applicable not only to two-dimensions but also to three-dimensions. The scanning of the invention is performed by dividing two-dimensional image into a number of small image blocks, thereafter the small image blocks are scanned as one-dimensional vector. The scanning order of each small image block arranged in the whole image is changed symmetrically in the directions of longitudinal and transversal axes so that the starting and ending points of image block may be identical.

4 Claims, 5 Drawing Sheets

SYMMETRICAL IMAGE BLOCK SCANNING METHOD FOR REDUCING BLOCK EFFECT

BACKGROUND OF THE INVENTION

The present invention relates to a scanning method for reducing block effect in image coding, and more particularly to a symmetrical image block scanning method which can achieve better image quality by changing the scanning order.

In general, vector quantisation is known to be an effective scheme for data compression, especially for low-rate image date compression. To achieve low-rate vector quantisation system with acceptable image quality, the vector dimension should be increased. With the dimension increased, block effects become more visible. There has been extensive research directed towards reducing block effects, which are mainly related to transform coding methods. As an example, raster scan method is widely used as the scanning method. In the raster scan method, the scan is conducted in the order of which is shown in FIG. 8, and picture elements arranged in the scanning order constitute one vector which indicates said image block. In FIG. 8, five scan lines are illustrated in one block for convenience, but in fact the number of scan lines may be higher than that or lower than that of said lines.

In such raster scan method, however, the starting points of block scan or the ending points of block scan exist separately by the distance of one block because all of the blocks adjacent to each other are scanned in the same shape. Accordingly, in the process of quantisation of the vectors, the spatial relations among picture elements are not reflected so that among the reproduced image blocks block boundary effects may be produced. Particularly, there is a disadvantage in that the bigger the quantisation interval, the block boundary effects become serious.

SUMMARY OF THE INVENTION

An object of the present invention is to elimate the above mentioned disadvantages of the conventional scanning method.

According to the method of the present invention, the spatial relations among the image blocks are reflected in the formation of the vector by performing the scan procedures symmetrically to the left and right, the upper and lower sides, according to the position of the image block, in order to make the starting or ending points of scan within the adjacent image blocks become always close to each other, thereby the block boundary effect which may be proculed by the vector quantisation can be reduced.

BRIEF DESCRIPTION OF THE DRAWINGS

These and other objects, features and advantages of the present invention will become more apparent from the following detailed description taken in conjunction with the accompanying drawings, wherein.

DETAILED DESCRIPTION OF THE INVENTION

Figure 1:
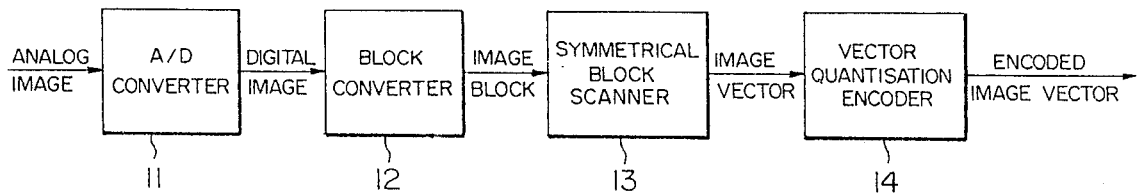
FIG. 1 is a block diagram of hardware of a vector quantisation encoding system being applied to a method of the present invention.

FIG. 1 shows a block diagram of vector quantisation encoding system according to the present invention. As shown in FIG. 1, a vector quantisation encoding system according to the present invention comprises an analog/digital converter 11 for converting an analog image source into a digital image data, image, a block converter 12 for converting the digital image frame from said analog/digital converter 11 into successive block of the image data a symmetrical block scanner 13 for symmetrically scanning each image block from said block converter 12 as an image vector, and a vector quantisation encoder 14 for encoding the image vector from said symmetrical block scanner 13 by performing any kind of vector quantisation operation in public domain.

Figure 2:
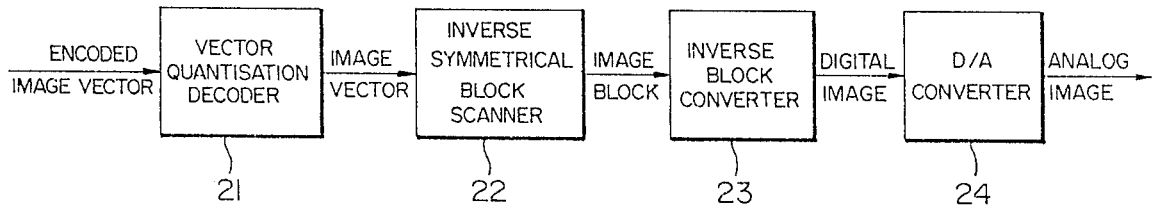
FIG. 2 is a block diagram of hardware of a vector quantisation decoding system according to the present invention.

FIG. 2 shows a hardware block diagram of vector quantisation decoding system for decoding the signal encoded in FIG. 1. As shown in FIG. 2, the vector quantisation decoding system comprises a vector quatisation decoder 21 for decoding the image vector encoded in FIG. 1 performing any kind of vector, a reverse symmetrical block scanner 22 for symmetrically scanning the image vector from said vector quantisation decoder 21 as an image block (in the reverse fashion of the block diagram illustrated in FIG. 3), a reverse block converter 23 for converting the successive image blocks from said reverse symmetrical block scanner 22 into a digital image frames, and a digital/analog converter 24 for converting the digital image from said reverse block converter 23 into an analog image output.

Figure 3:
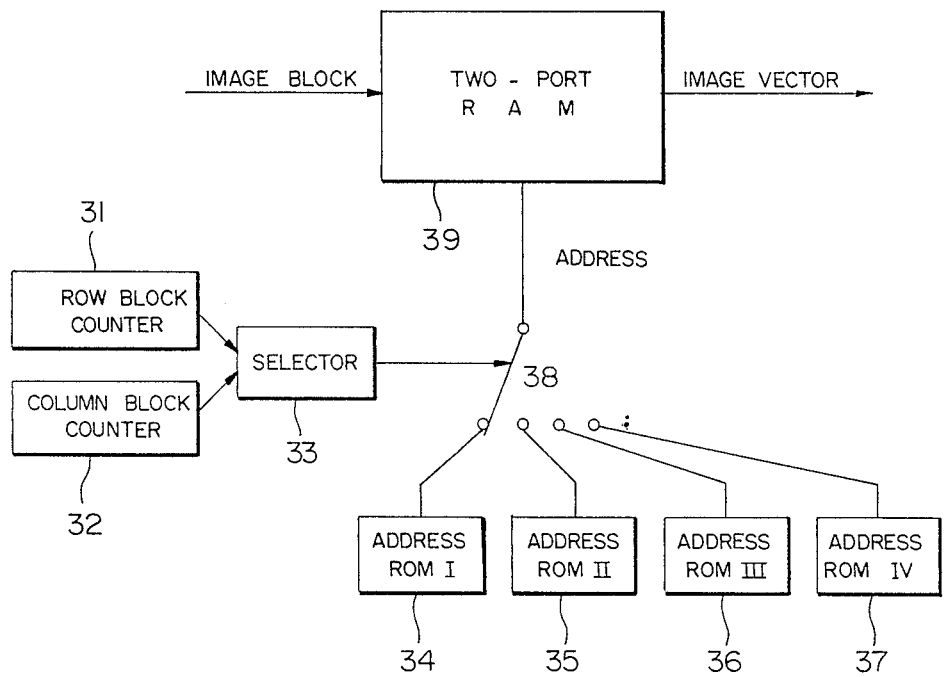
FIG. 3 is a block diagram of hardware of a symmetrical block scanning, method according to the present invention.

FIG. 3 shows a detailed block diagram of the symmetrical block scanner 13 illustrated in FIG. 1. As shown in FIG. 3, the hardware of the present invention is composed of row and column block counters 31 and 32 for respectively counting image blocks in a whole image transversely and longitudinally in order, a selector 33 for generating an address selection control signal by means of the counting signals of said row and column block counters 31 and 32, the first, the second, the third and the fourth address ROMs 34,35,36 and 37 by means of the address selection control signal of said selector 33, and a 2-port RAM 39 for converting an image block into an image vector by means of a scanning order selected via said switch 38. The resulting image vector is then subject to any kind of vector quantisation. In said first, second, third and fourth RAMs, scanning addresses of the symmetrical image block scanning method according to the invention illustrated in FIG. 4, FIG. 5, FIG. 6 or FIG. 7 which will be described hereinafter, are stored respectively.

Figure 4:
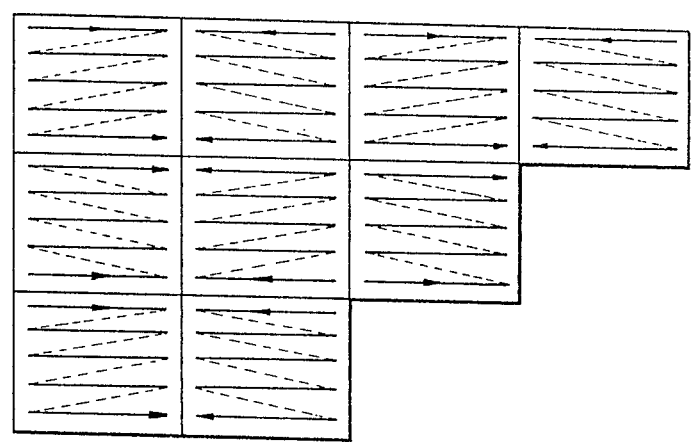
FIG. 4 is a block diagram in which the symmetrical image block scanning method according to the present invention is applied to two-dimensions.

FIG. 4 shows an explanatory view of a symmetrical image block scanning method of the present invention being applied to two-dimensions. As shown in the drawing, an image block in line 1 of row 1 is scanned in the same way as the conventional method, another image block in line 2 of row 1 is symmetrically scanned in the same way as said image block in line 1 of row 1 only in the direction of transversal axis, and thereafter the other image block in line 3 of row 1 is scanned in the same as the scanning method of the image block in line 1 of row 1, and the others are also scanned same as the above method. Further, an image block in line 1 of row 2 is scanned symmetrically with said image block in line 1 of row 1 in the direction of its longitudinal axis, and another image block in line 2 of row 2 is scanned symmetrically with said image block in line 2 of row 1 in the direction of its transversal axis. Thereafter the other image block in line 3 of row 3 is scanned identically with said scanning method of the image block in line 1 of row 2, and the others in row 2 are also scanned same as the above described method. Furthermore, the scanning method of the image blocks in row 3 is the same as said image blocks in row 1. According to the above described scanning method, the starting points and ending points of the adjacent image blocks are always maintained in the state of approachment to each other as shown in FIG. 4.

Figure 5:
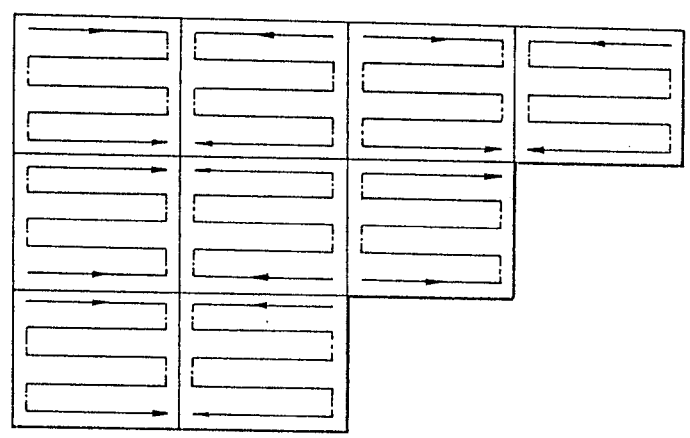
FIG. 5 is another block diagram in which the symmetrical image block scanning method according to the present invention is applied to two-dimensions.

FIG. 5 shows another explanatory view of a symmetrical image block scanning method of the present invention being applied to two-dimensions. As shown in the drawing, in this method the scanning is performed continuously when one scan line has been scanned and thereafter the next scan line is scanned, whereas in the image block scanning method as shown in FIG. 4, at the time of scanning the next scan line after scanning the previous scan line, the scanning is discontinuously performed.

Figure 6:
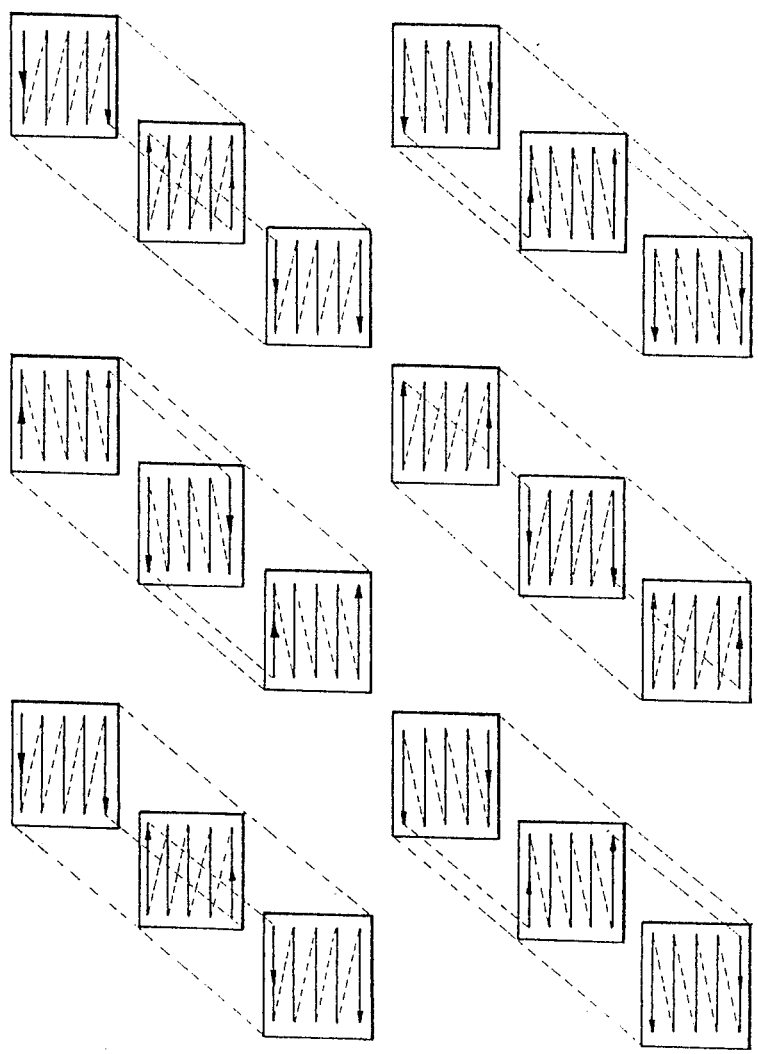
FIG. 6 is a block diagram in which the symmetrical image block scanning method according to the present invention is applied to three-dimensions.

FIG. 6 shows an explanatory view of a symmetrical image block scanning method of the present invention being applied to three-dimensions. In this example, the image block scanning method described in FIG. 4 is applied to three-dimensions.

Figure 7:
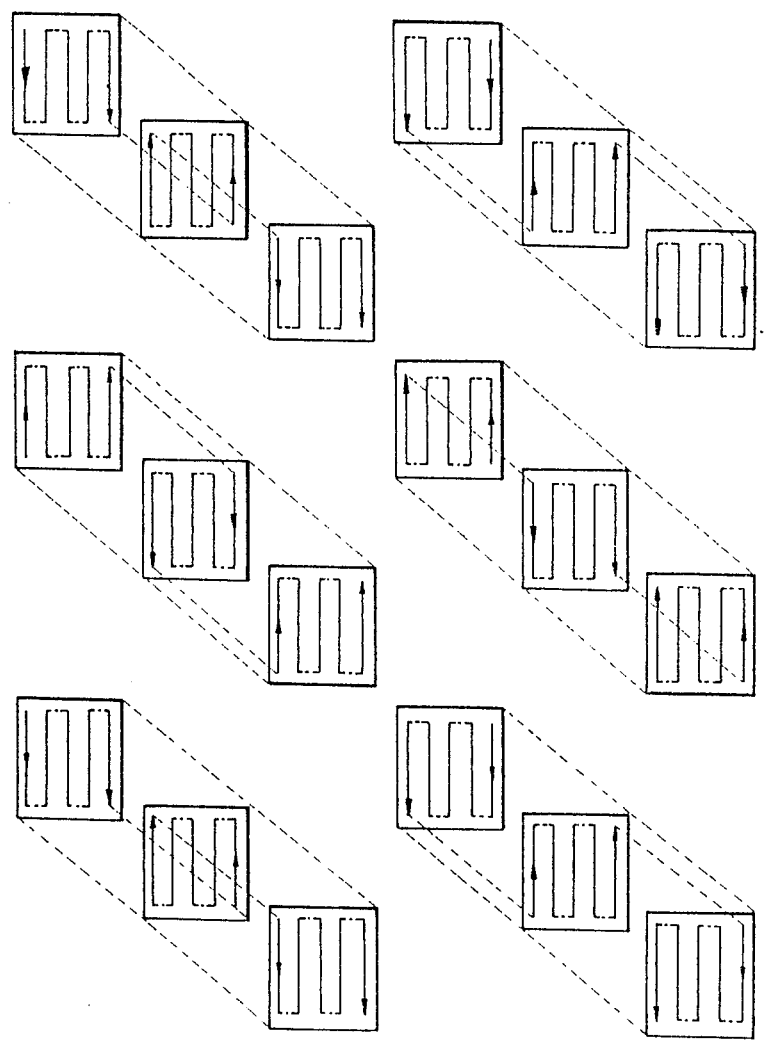
FIG. 7 is another block diagram in which the symmetrical image block scanning method according to the present invention is applied to three-dimensions.
Figure 8:
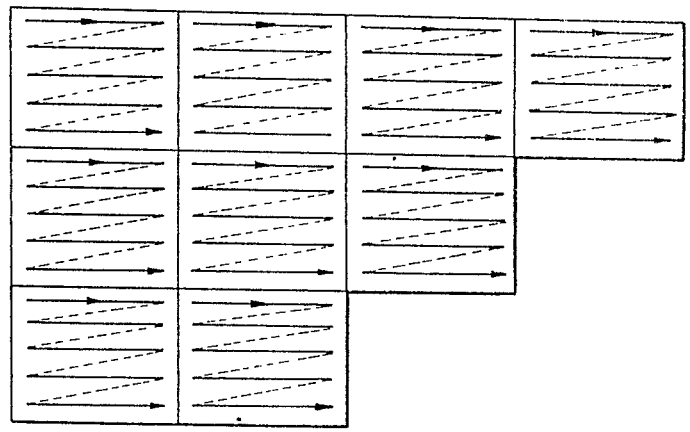
FIG. 8 is a block diagram of a conventional image block scanning method.

FIG. 7 shows another explanatory view of a symmetrical image block scanning method of the present invention being applied to three-dimensions. In this example, the image block scanning method described in FIG. 5 is applied to three-dimensions.

As described in the above, in the symmetrical image block scanning method of the present invention, since the starting and ending points within the adjacent image blocks are always maintained in the state of approximity, the spatial relations between the image blocks may be considered in the formation of image vector so that the block boundary effects which may be produced, can be conspicuously reduced.

What is claimed is:

1. A scanning method for reducing block effect in the image block scanning comprising steps of: dividing two-dimensional whole image into a number of small image blocks; and scanning said respective small image blocks within said whole image symmetrically in the direction of their transversal and longitudinal axes so that the starting and ending points of each adjacent image block may be coincident.

2. The method according to claim 1, wherein said scanning order is continuous when the next row of said small image blocks is scanned after the scanning of the previous row.

3. The method according to claim 1, wherein said two-dimensional image block scanning is applied to three-dimensional image block.

4. The method according to claim 2, wherein said two-dimensional image block scanning is applied to three-dimensional image block.

* * * * *